(12) United States Patent
Matsubara et al.

(10) Patent No.: US 11,119,451 B2
(45) Date of Patent: Sep. 14, 2021

(54) APPARATUS, METHOD, PROGRAM, AND RECORDING MEDIUM

(71) Applicants: Yokogawa Electric Corporation, Tokyo (JP); NATIONAL UNIVERSITY CORPORATION NARA INSTITUTE OF SCIENCE AND TECHNOLOGY, Nara (JP)

(72) Inventors: Takamitsu Matsubara, Nara (JP); Yunduan Cui, Nara (JP); Lingwei Zhu, Nara (JP); Hiroaki Kanokogi, Tokyo (JP); Morihiro Fujisaki, Tokyo (JP); Go Takami, Tokyo (JP); Yota Furukawa, Tokyo (JP)

(73) Assignees: Yokogawa Electric Corporation, Tokyo (JP); NATIONAL UNIVERSITY CORPORATION NARA INSTITUTE OF SCIENCE AND TECHNOLOGY, Nara (JP)

( * ) Notice: Subject to any disclaimer, the term of this patent is extended or adjusted under 35 U.S.C. 154(b) by 29 days.

(21) Appl. No.: 16/537,526

(22) Filed: Aug. 10, 2019

(65) Prior Publication Data

US 2020/0057416 A1 Feb. 20, 2020

(30) Foreign Application Priority Data

Aug. 17, 2018 (JP) .............................. JP2018-153340

(51) Int. Cl.
*G05B 13/02* (2006.01)
*G06N 20/10* (2019.01)
(Continued)

(52) U.S. Cl.
CPC ............ *G05B 13/02* (2013.01); *F01K 23/101* (2013.01); *G06N 5/003* (2013.01); *G06N 20/10* (2019.01)

(58) Field of Classification Search
CPC .... G05B 13/02; G05B 13/0265; G06N 20/10; G06N 5/003; G06N 7/005; G06N 20/00; G06N 3/006; F01K 23/101
(Continued)

(56) References Cited

U.S. PATENT DOCUMENTS 9,817,383 B1 * 11/2017 Sinha .................. G05B 13/0265
2010/0070098 A1    3/2010 Sterzing
(Continued)

FOREIGN PATENT DOCUMENTS

| JP | 2004178492 A | 6/2004 |
| JP | 2011197714 A | 10/2011 |
| WO | 2007121322 A2 | 10/2007 |

OTHER PUBLICATIONS

Xin Xu, "Kernel-Based Approximate Dynamic Programming for Real-Time Online Learning Control: An Experimental Study", Jan. 2014, IEEE, Transactions on Control System Technology, vol. 22, pp. 146-156 (Year: 2014).*

(Continued)

*Primary Examiner* — Rocio Del Mar Perez-Velez
*Assistant Examiner* — Christopher W Carter (57) ABSTRACT

Provided is an apparatus including a plurality of agents that each set some devices among a plurality of devices provided in a facility to be target devices, wherein each of the plurality of agents includes a state acquiring section that acquires state data indicating a state of the facility; a control condition acquiring section that acquires control condition data indicating a control condition of each target device; and a learning processing section that uses learning data including the state data and the control condition data to perform learning processing of a model that outputs recommended
(Continued)

control condition data indicating a control condition recommended for each target device in response to input of the state data.

13 Claims, 7 Drawing Sheets

(51) Int. Cl.
    *F01K 23/10*     (2006.01)
    *G06N 5/00*     (2006.01)

(58) Field of Classification Search
    USPC .......................................................... 700/29
    See application file for complete search history.

(56) References Cited

U.S. PATENT DOCUMENTS

| | | |
|---|---|---|
| 2014/0257526 A1 | 9/2014 | Tiwari |
| 2018/0024520 A1 | 1/2018 | Sinha |
| 2018/0032082 A1* | 2/2018 | Shalev-Shwartz .......................... B60W 30/0953 |
| 2018/0364654 A1* | 12/2018 | Locke ................. H04L 12/2827 |

OTHER PUBLICATIONS

Extended European Search Report for European Patent Application No. 19190755.9, issued by the European Patent Office dated Feb. 6, 2020.

J.C.Hoskins, et al. (1992). "Process control via artificial neural networks and reinforcement learning".Computers and Chemical Engineering, vol. 16,No. 4,pp. 241-251.

Shumpei Kubosawa, et al. "Synthesizing chemical plant operation procedures using knowledge, dynamic simulation and deep reinforcement learning".In SICE annual conference (pp. 1376-1379).

Thomas A.Badgwell, et al.(2018). "Reinforcement learning—overview of recent progress and implications for process control. In 13th international symposium on process systems engineering". Computer and chemical engineering (pp. 71-85).

Office Action issued for counterpart Japanese Application No. 2018-153340, issued by the Japan Patent Office dated Jan. 5, 2021 (drafted on Dec. 21, 2020).

Yunduan Cui et al."Kernel Dynamic Policy Programming: Practical Reinforcement Learning for High-dimensional Robots"2016 IEEE-RAS 16th International Conference on Humanoid Robots(Humanoids),MX,IEEE,Nov. 15, 2016,p. 662-667.

* cited by examiner

APPARATUS, METHOD, PROGRAM, AND RECORDING MEDIUM

The contents of the following Japanese patent application (s) are incorporated herein by reference:

2018-153340 filed in JP on Aug. 17, 2018

BACKGROUND

1. Technical Field

The present invention relates to an apparatus, a method, a program, and a recording medium.

2. Related Art

Conventionally, in a facility such as a plant, advanced automated work is realized using a distributed control system (DCS) in which sensors and manipulated devices are connected via a communication means to a control apparatus controlling these sensors and devices. In such a facility, the yield, operational state, alarm occurrence state, and the like of the facility are measured by the sensors, the measurement results are collected via the DCS, and these measurement results are displayed in a monitoring apparatus such as a monitor of a monitoring terminal or an operation board. If the yield of the facility is to be increased, for example, the board operator who monitors the operational state of the facility issues instructions for adjusting manipulated devices such as valves to a worker referred to as a field operator. Recently, in order to optimize such adjustments of manipulated devices and the like through machine learning, technology is being developed whereby control conditions recommended for each manipulated device are calculated and the work in the facility is automated, as shown in Patent Document 1, for example.

Patent Document 1: Japanese Patent Application Publication No. 2014-174993

However, when simply performing machine learning, there are a huge number of parameters to be learned, the time needed until the learning converges is unrealistically long, and there are cases where the learning does not converge, and therefore it is impossible to calculate the control conditions recommended for the manipulated devices.

SUMMARY

According to a first aspect of the present invention, provided is an apparatus. The apparatus may comprise a plurality of agents that each set some devices among a plurality of devices provided in a facility to be target devices. Each of the plurality of agents may include a state acquiring section that acquires state data indicating a state of the facility. Each of the plurality of agents may include a control condition acquiring section that acquires control condition data indicating a control condition of each target device. Each of the plurality of agents may include a learning processing section that uses learning data including the state data and the control condition data to perform learning processing of a model that outputs recommended control condition data indicating a control condition recommended for each target device in response to input of the state data.

Each learning processing section may perform the learning processing of the model using the learning data and a reward value determined according to a preset reward function. Each model may output the recommended control condition data indicating the control condition of each target device recommended for increasing the reward value beyond a reference reward value, in response to input of the state data.

Each of the plurality of agents may further include a recommended control condition output section that outputs the recommended control condition data obtained by supplying the model with the state data.

Each recommended control condition output section may use the model to output the recommended control condition data indicating a closest control condition included in a control condition series that is most highly recommended, among a plurality of control condition series obtained by selecting any one control condition from among a plurality of control conditions of the target device at each timing in the future.

Each of the plurality of agents may further include a control section that controls the target device according to the control condition indicated by the recommended control condition data. Each state acquiring section may acquire the state data after the target device has been controlled by the control section.

The state acquiring sections in at least two agents among the plurality of agents may acquire the state data that is common therebetween.

The state acquiring section of at least one agent among the plurality of agents may acquire the state data that further includes control condition data indicating a control condition of a device that is not a target device of the at least one agent among the plurality of devices.

The learning processing section of each agent may perform learning processing using kernel dynamic policy programming for the target device independently from another agent that differs from this agent.

A collection of target devices of each of the plurality of agents may include only target devices that are not in a collection of target devices of each other agent differing from this agent among the plurality of agents.

Each of the plurality of agents may set a single device to be the target device.

According to a second aspect of the present invention, provided is a method. In the method, a plurality of agents, which each set some devices among a plurality of devices provided in a facility to be target devices, each acquire state data indicating a state of the facility. In the method, the plurality of agents may each acquire control condition data indicating a control condition of each target device. In the method, the plurality of agents may each acquire use learning data including the state data and the control condition data to perform learning processing of a model that outputs recommended control condition data indicating a control condition recommended for each target device in response to input of the state data.

According to a third aspect of the present invention, provided is a program. The program may cause one or more computers to function as a plurality of agents that each set some devices among a plurality of devices provided in a facility to be target devices. Each of the plurality of agents may include a state acquiring section that acquires state data indicating a state of the facility. Each of the plurality of agents may include a control condition acquiring section that acquires control condition data indicating a control condition of each target device. Each of the plurality of agents may include a learning processing section that uses learning data including the state data and the control condition data to perform learning processing of a model that outputs recommended control condition data indicating a control condition recommended for each target device in response to input of the state data.

According to a fourth aspect of the present invention, provided is a recording medium storing thereon a program. The program may cause one or more computers to function as a plurality of agents that each set some devices among a plurality of devices provided in a facility to be target devices. Each of the plurality of agents may include a state acquiring section that acquires state data indicating a state of the facility. Each of the plurality of agents may include a control condition acquiring section that acquires control condition data indicating a control condition of each target device. Each of the plurality of agents may include a learning processing section that uses learning data including the state data and the control condition data to perform learning processing of a model that outputs recommended control condition data indicating a control condition recommended for each target device in response to input of the state data.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

1. Configuration of the System 1

Figure 1:
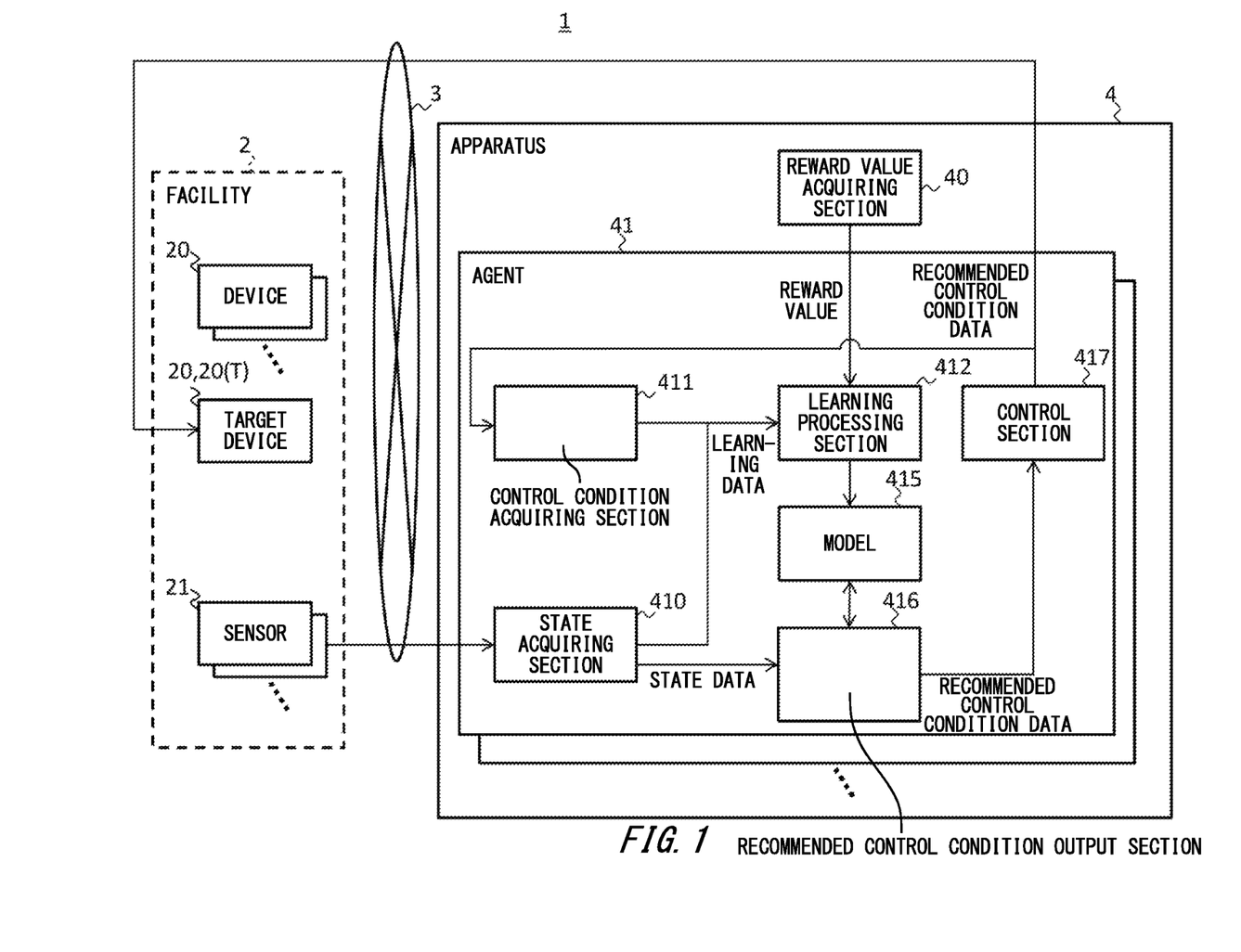
FIG. 1 shows a system 1 according to the present embodiment.

FIG. 1 shows a system 1 according to the present embodiment. The system 1 includes a facility 2, a network 3, and an apparatus 4.

1-1. Facility 2

The facility 2 includes a plurality of devices 20. For example, the facility 2 may be a plant, or may be a composite apparatus in which a plurality of devices 20 are combined. Examples of such a plant include industrial plants relating to chemical or biological industries, plants that manage and control well sources such as gas fields and oil fields and the surrounding areas, plants that manage and control power generation such as hydro, thermal, or nuclear power, plants that manage and control environmental power generation such as solar power and wind power, plants that control water, sewage, and dams, and the like. As an example in the present embodiment, the facility 2 includes a plurality of devices 20 and a plurality of sensors 21.

1-1-1. Devices 20

Each device 20 is a tool, machine, or apparatus, and as an example, may be an actuator such as a valve, pump, heater, fan, motor, or switch that controls at least one physical quantity such as the pressure, temperature, pH, velocity, flow rate, or the like in a process in the facility 2. A switch may change the order of processes in the plant that is the facility 2, for example. The devices 20 may each be different types, or at least some of two or more devices 20 may be the same type. At least some of the devices 20 may be target devices 20(T) that are learning targets of an agent 41, described further below. As an example in the present embodiment, the devices 20 are controlled in a wired or wireless manner from outside, via the network 3, but the devices 20 may instead be controlled manually.

1-1-2. Sensors 21

Each sensor 21 measures or identifies the state of the facility 2. Each sensor 21 may measure or identify operational states such as the yield of the facility 2, the ratio of impurities mixed in, the operational state of each device 20, or an alarm occurrence state. The operational state of a device 20 may be expressed by at least one physical quantity such as the pressure, temperature, pH, velocity, and flow rate controlled by the device 20, for example. An alarm may be issued in response to an abnormality occurring in the facility 2, and as an example, a sensor 21 identifying an alarm occurrence state may identify there to be an alarm occurrence state in response to a measured value moving beyond at least one of an upper limit value or a lower limit value. Each sensor 21 may supply the apparatus 4 with a result of the measurement of identification, via the network 3.

1-2. Network 3

The network 3 connects each device 20 and sensor 21 in the facility 2 to the apparatus 4, in a manner enabling communication. In the communication performed within the network 3, at least the communication between the devices 20 and the apparatus 4 may be performed using a wireless communication protocol of the ISA (International Society of Automation), for example, and may be performed using ISA 100, HART (Highway Addressable Remote Transducer) (Registered Trademark), BRAIN (Registered Trademark), FOUNDATION Fieldbus, or PROFIBUS. The communication between the sensors 21 and the apparatus 4 can also be performed using the above communication protocols.

1-3. Apparatus 4

The apparatus 4 performs learning for the plurality of devices 20. The apparatus 4 may be one or more computers, may be configured as a PC or the like, or may be realized by cloud computing. The apparatus 4 includes a reward value acquiring section 40 and a plurality of agents 41.

1-3-1. Reward Value Acquiring Section 40

The reward value acquiring section 40 acquires reward values used for reinforcement learning by the agents 41, and acquires reward values for evaluating the operational state of the facility 2. The reward values may be values determined by a preset reward function. Here, the function is mapping that has a rule causing each element of one collection to correspond to each element of another collection with a one-to-one relationship, and may be an expression or table, for example. The reward function may output a reward value obtained by evaluating a state, in response to the input of state data indicating this state. The reward function may be set by an operator. The reward value acquiring section 40 may acquire the reward values from an operator that used the reward function, or may acquire the reward values by inputting the state data from the sensors 21 into the reward function. If the reward value acquiring section 40 inputs the state data into the reward function, the reward function may be stored within the apparatus 4 or may be stored outside the apparatus 4.

1-3-2. Agents 41

The plurality of agents 41 set some of the devices 20 in the facility 2 to be target devices 20(T). Each agent 41 may have one or more target devices 20(T), and the plurality of agents 41 may each have the same number or a different number of target devices 20(T). The collection of target devices 20(T) of each of the plurality of agents 41 may include only target devices that are not in the collections of target devices 20 (T) of other agents 41 differing from this agent 41. Each collection of target devices 20(T) may be a collection of a plurality of devices 20 included in a single apparatus, or may be a collection of at least some of a plurality of devices 20 included in different apparatuses. If a plurality of target devices 20(T) are set for a single agent 41, these target devices 20(T) may have a relationship to be controlled in conjunction with each other (e.g. a master-slave relationship or a relationship where these target devices 20(T) are not controlled independently). Each agent 41 may set a different single device 20 to be a target device 20(T). As an example, the number of agents 41 may be the same as the number of devices 20 in the facility 2, in which case each device 20 may be a target device 20(T) of an agent 41. Instead, the number of agents may be less than the number of devices 20 in the facility 2, in which case the facility 2 may include devices 20 that are not target devices 20(T) of an agent 41.

Each agent 41 includes a state acquiring section 410, a control condition acquiring section 411, a learning processing section 412, a model 415, a recommended control condition output section 416, and a control section 417.

1-3-2(1). State Acquiring Section 410

The state acquiring section 410 acquires the state data indicating the state of the facility 2. The state data may include at least one state parameter indicating a result of a measurement or identification by a sensor 21. As an example in the present embodiment, the state acquiring section 410 acquires the state parameter from a sensor 21, but may instead acquire the state parameter from an operator who has checked a sensor 21. The state acquiring section 410 may supply the learning processing section 412 and the recommended control condition output section 416 with the acquired state data.

1-3-2(2). Control Condition Acquiring Section 411

The control condition acquiring section 411 acquires control condition data indicating a control condition of each target device 20(T). The control condition may be a setting value, target value, or manipulation amount input directly to the device 20. As an example in the present embodiment, the control condition acquiring section 411 acquires the control condition data from the control section 417, but may instead acquire the control condition data from the target device 20(T) or from the operator. The control condition acquiring section 411 supplies the learning processing section 412 with the acquired control condition data.

1-3-2(3). Learning Processing Section 412

The learning processing section 412 performs learning processing of the model 415, using learning data that includes the state data and the control condition data. As an example in the present embodiment, the learning processing section 412 may perform the learning processing of the model 415 further using the reward values from the reward value acquiring section 40.

1-3-2(4). Model 415

The model 415 outputs recommended control condition data indicating a recommended control condition for each target device 20(T), in response to the input of state data. The recommended control condition may be a control condition for increasing the reward value to beyond a reference reward value. The reference reward value may be a reward value corresponding to a work state of the facility 2 at a prescribed timing (e.g. the current time), such as a reward value obtained by inputting the state data at this timing into the reward function, or may be a fixed value (e.g. a value obtained by subtracting a tolerance value from the maximum value of the reward value). The model 415 may be stored in a server outside the apparatus 4, in association with the agent 41.

1-3-2(5). Recommended Control Condition Output Section 416

The recommended control condition output section 416 outputs the recommended control condition data obtained by supplying the state data to the model 415. In other words, the recommended control condition output section 416 supplies the model 415 with the state data and also outputs the recommended control condition data obtained from the model 415 in response to being supplied with the state data. The recommended control condition output section 416 may supply the control section 417 with the recommended control condition data. The recommended control condition output section 416 may output the recommended control condition data to the outside of the apparatus 4.

1-3-2(6). Control Section 417

The control section 417 controls the target device 20(T) according to the control condition indicated by the recommended control condition data. For example, the control section 417 controls the target device 20(T) according to the control condition indicated by the recommended control condition data by supplying the target device 20(T) with the recommended control condition data. A controller (not shown in the drawings) of the target device 20(T) may be interposed between the control section 417 and the target device 20(T).

According to the system 1 described above, the learning processing of the model 415 is performed by each agent 41 using the learning data that includes the state data of the facility 2 and the control condition data of the target device 20(T), and therefore it is possible to reduce the number of computational processes in the learning processing compared to a case where the learning processing of the model 415 is performed using learning data that includes the control condition data of all of the devices 20. Accordingly, the learning of the model 415 can be made to converge, and the control condition data recommended for each target device 20(T) can be acquired by inputting the state data to the obtained model 415.

Since the recommended control condition data of each target device 20(T) that is recommended for increasing the reward value beyond the reference reward value is output from the model 415, it is possible to acquire more suitable recommended control condition data by using the model 415. Furthermore, since the recommended control condition output section 416 that supplies the state data to the model 415 and outputs the recommended control condition data is implemented in the apparatus 4, it is possible to acquire the recommended control condition data by inputting the state data to the apparatus 4 and to output the recommended control condition data to a component inside the apparatus 4 or to the outside of the apparatus 4.

In a case where the collection of target devices 20(T) of each of the plurality of agents 41 includes only target devices 20(T) that are not in the collections of target devices 20(T) of the other agents 41, it is possible to perform the learning processing while distributing the processing for a plurality of devices 20 among the agents 41. Accordingly, it is possible to prevent the learning processing that is redundant for some of the devices 20, to reduce the number of computational processes. Furthermore, since the correspondence to the learning content is lower than in a case where learning is performed in a redundant manner for the same device 20 by a plurality of agents 41, it is possible to realize each agent 41 with an individual PC and to efficiently perform distributed processing. Yet further, it is possible to use PCs with low machine power by performing this distributed processing.

In the case where each agent 41 sets a single device 20 to be a target device 20(T), it is possible to reduce the number of computational processes of each agent 41, compared to a case where each agent 41 sets a plurality of devices 20 as target devices 20(T).

2. Model 415 and Recommended Control Condition Output Section 416

Figure 2:
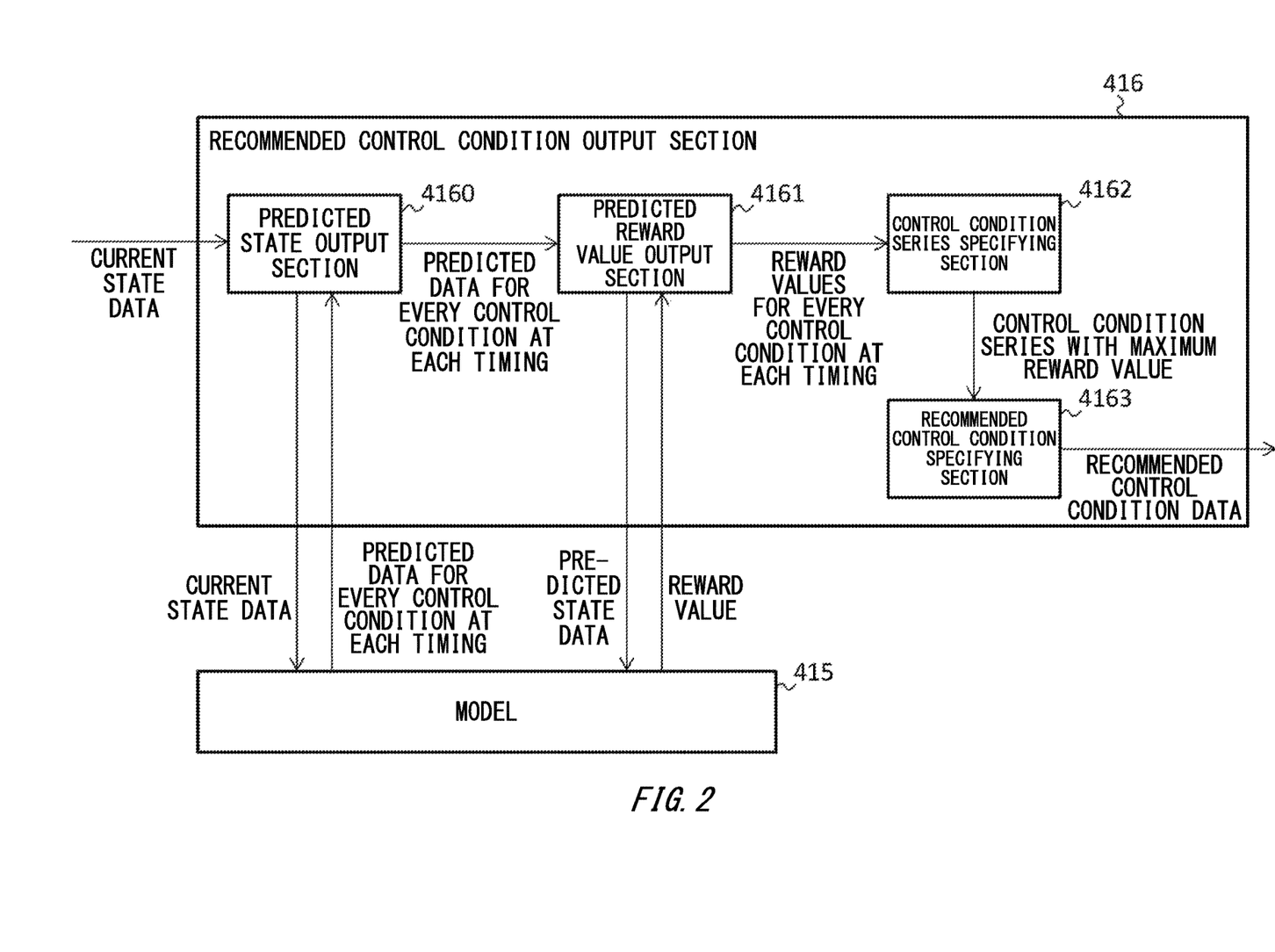
FIG. 2 shows the model 415 and the recommended control condition output section 416.

FIG. 2 shows the model 415 and the recommended control condition output section 416.

2-1. Model 415

As an example in the present embodiment, the model 415 may store a history of the state data input thereto. The history includes at least the state data at one timing. The model 415 may output a probability distribution of predicted state data indicating the predicted state of the facility 2 at each of a plurality of future timings $(t_{+1})$, $(t_{+2})$, etc., where the suffixes "+1" and "+2" are identifiers and larger values indicate later timings, in response to state data being newly input.

Here, the plurality of future timings $(t_{+1})$, $(t_{+2})$, etc. may be timings at every unit time (e.g. 30 seconds) within a reference time period (e.g. 10 minutes) from the current timing. The predicted state data may display the predicted state of the facility 2 in a case where any of the controls indicated by the control conditions $(C_1)$, $(C_2)$, etc. are performed on a target device 20(T) at each timing $(t_{+1})$, $(t_{+2})$, etc. As an example, the predicted state data may comprehensively include the predicted state data $(D(C_{1\_t+1}))$, $(D(C_{1\_t+2}))$, etc. (where the suffixes "t+1" and "t+2" indicate the timings at which the control is to be performed) in cases where the controls of the control conditions $(C_{1\_t+1})$, $(C_{1\_t+2})$, etc. are to be performed at the timing $(t_{+1})$, the predicted state data $(D(C_{1\_t+2}))$, $(D(C_{2\_t+2}))$, etc. in a case where the controls of the control conditions $(C_{1\_t+2})$, $(C_{2\_t+2})$, etc. are to be performed at the timing $(t_{+2})$, and the like. The probability mentioned above is the degree of the possibility of an event occurring, and may be the percentage chance of this event occurring or a value (relative value) corresponding to this percentage.

The model 415 may output the reward value predicted in a case where the state of the facility 2 is the state indicated by the predicted state data, for every piece of predicted state data. For example, the model 415 may output the reward value in response to the selection of a piece of predicted state data that is predicted in response to the input of the current state data, or may output the reward value in response to the input of the predicted state data.

2-2. Recommended Control Condition Output Section 416

The recommended control condition output section 416 uses the model 415 to output the recommended control condition data indicating the control condition that is closest in the future relative to the current timing included in a control condition series that is most highly recommended among a plurality of control condition series obtained by selecting one control condition $(C_N)$ (where N is any natural number) from among the plurality of control conditions $(C_1)$, $(C_2)$, etc. of the target device 20(T) at each future timing $(t_{+1})$, $(t_{+2})$, etc. The recommended control condition output section 416 includes a predicted state output section 4160, a predicted reward value output section 4161, a control condition series specifying section 4162, and a recommended control condition specifying section 4163.

2-2-1. Predicted State Output Section 4160

The predicted state output section 4160 outputs the predicted state data (D) for every control condition $(C_1)$, $(C_2)$, etc. at each future timing $(t_{+1})$, $(t_{+2})$, etc. to the predicted reward value output section 4161. For example, the predicted state output section 4160 may input the current state data to the model 415, acquire, from the model 415, a probability distribution of the predicted state data (D) in cases where any of the controls indicated by the control conditions $(C_1)$, $(C_2)$, etc. are to be performed on a device 20 at each future timing $(t_{+1})$, $(t_{+2})$, etc., and output this probability distribution to the predicted reward value output section 4161.

2-2-2. Predicted Reward Value Output Section 4161

The predicted reward value output section 4161 outputs a reward value for every control condition $(C_1)$, $(C_2)$, etc. at each future timing $(t_{+1})$, $(t_{+2})$, etc. to the control condition series specifying section 4162. For example, the predicted reward value output section 4161 may sequentially input to the model 415 the pieces of predicted state data (D) for every control condition $(C_1)$, $(C_2)$, etc. at each timing $(t_{+1})$, $(t_{+2})$, etc., sequentially acquire, from the model 415, reward values predicted for cases where and the facility 2 has entered a state indicated by this predicted state data (D), and output these reward values to the control condition series specifying section 4162.

2-2-3. Control Condition Series Specifying Section 4162

The control condition series specifying section 4162 generates a plurality of control condition series ($C_{N\_t+1}$), ($C_{N\_t+2}$), etc. obtained by selecting any one control condition ($C_N$) at each future timing ($t_{+1}$), ($t_{+2}$), etc. In other words, the control condition series specifying section 4162 generates a plurality of control condition sequences (control condition series) by selecting and linking together one control condition ($C_N$) at every timing ($t_{+1}$), ($t_{+2}$), etc. Furthermore, the control condition series specifying section 4162 specifies a control condition series having the highest total of predicted reward values corresponding to the control conditions, as an example of the control condition series that is most highly recommended among the plurality of control conditions series.

2-2-4. Recommended Control Condition Specifying Section 4163

The recommended control condition specifying section 4163 specifies the control condition ($C_{N\_t+1}$) that is closest in the future to the current timing, among the control conditions at each timing included in the specified control condition series, and outputs the control condition data indicating this control condition ($C_{N\_t+1}$) as the recommended control condition data.

According to the recommended control condition output section 416 described above, the recommended control condition data indicating the closest control condition ($C_N$) included in the control condition series that is most highly recommended, among the control conditions obtained by selecting any one control condition ($C_N$) at each future timing ($t_{+1}$), ($t_{+2}$), etc., and therefore it is possible to acquire the recommended control condition data that is most highly recommended while taking into consideration a plurality of control conditions at each future timing. Furthermore, by performing the control of the target device 20(T) using such recommended control condition data, it is possible to gradually transition the state of the facility 2 to the most highly recommended state at each future timing.

3. Operation

Figure 3:
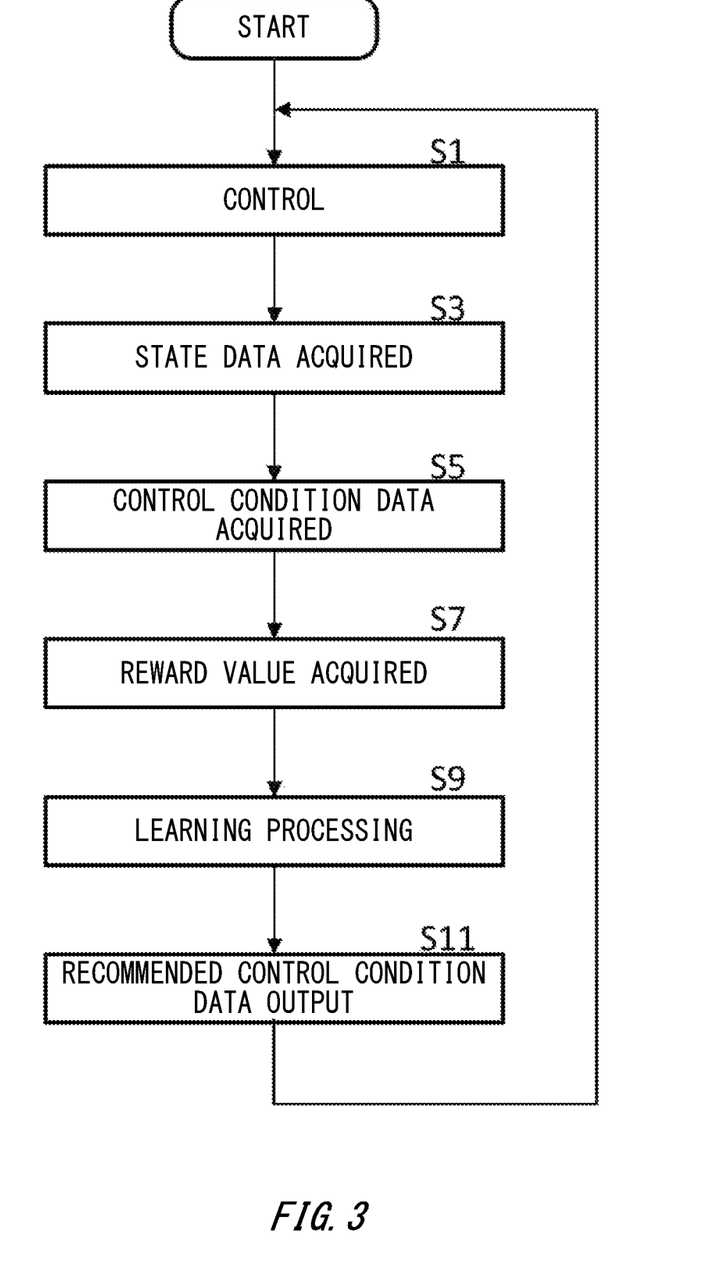
FIG. 3 shows the operation of the apparatus 4 according to the present embodiment.

FIG. 3 shows the operation of the apparatus 4 according to the present embodiment. The apparatus 4 performs learning of the model 415 while causing the facility 2 to operate, by performing the processes of steps S1 to S11.

First, at step S1, the control section 417 of each of the plurality of agents 41 controls the target device 20(T) by outputting the control condition data. For example, each control section 417 may control the corresponding target device 20(T) with the control condition data indicating the control condition set by the operator. At step S11 described further below, when the recommended control condition data is output by the recommended control condition output section 416, each control section 417 may control the corresponding target device 20(T) using this recommended control condition data.

At step S3, the state acquiring section 410 of each of the plurality of agents 41 acquires the state data indicating the current state of the facility 2. In this way, the state data after the target device 20(T) has been controlled by the control section 417 is acquired. Here, the state acquiring sections 410 of at least two agents 41 among the plurality of agents 41 may acquire common state data. For example, these state acquiring sections 410 may acquire state data from at least one common sensor 21, and as an example, all of the state acquiring sections 410 may acquire the state data from all of the sensors 21 within the facility 2. The state data acquired by the state acquiring section 410 of at least one agent 41 may include, as a state parameter, control condition data indicating a control condition of at least one other device 20 that is not a target device 20(T) among the plurality of devices 20 in the facility 2. In this case, the state acquiring section 410 may acquire the control condition data from the control section 417 of an agent 41 other than the agent 41 including this state acquiring section 410. The control condition of the other device 20 may be the current control condition, or may be the control conditions at one or more timings in the past (e.g. one control condition immediately prior to the current timing).

At step S5, the control condition acquiring section 411 of each of the plurality of agents 41 acquires the control condition data of the target device 20(T) from step S1. The process of step S5 may be performed before step S1, or may be performed between step S1 and step S3.

At step S7, the reward value acquiring section 40 acquires the reward value for evaluating the current operational state of the facility 2. Here, the reward function may include a parameter concerning at least one of the quality, manufacturing cost, yield, ratio of impurities mixed in, and energy consumed by the facility 2 for the object manufactured by the facility 2. The parameter concerning quality may be a maximum value in a case where the quality of the manufactured object is a specified quality, and the specified quality does not necessarily need to be the highest quality. The parameter concerning the manufacturing cost may be set according to the price of the raw material. The reward function may further include a normalization term to prevent learning using biased state data (e.g. state data when an alarm occurs). As an example, if the facility 2 is a manufacturing plant, the reward function may be set as shown in Expression 1 below.

Reward Value=100×measured value of the yield−50× measured value of the ratio of impurities mixed in−10000×number of alarm occurrences    Expression 1:

At step S9, the learning processing section 412 of each of the plurality of agents 41 performs the learning processing of the model 415 using the reward value and the learning data that includes the state data and the control condition data. The learning processing section 412 of each agent 41 may perform the learning processing using kernel dynamic policy programming (KDPP) for a target device 20(T) independently from other agents 41 that differ from this agent 41. As a result, the learning processing is performed using factorial KDPP for all of the target devices 20(T) of the agents 41, by all of the plurality of agents 41. Accordingly, compared to a case where the learning processing in which all of the devices 20 in the facility 2 are target devices 20(T) is performed by one agent 41 using KDPP, it is possible to reduce the number of target devices 20(T) and to reduce the number of computational processes. Here, the process recorded in "Y. Cui, T. Matsubara, and K. Sugimoto, "Kernel dynamic policy programming. Applicable reinforcement learning to robot systems with high dimensional states," Neural networks, vol. 94, pp. 13-23, 2017" can be used as the learning processing using KDPP, for example. Instead of using KDPP, each learning processing section 412 may perform the learning processing using the steepest descent method, a neural network, a DQN (deep Q-network), a Gaussian process, deep learning, or the like. Furthermore, each learning processing section 412 may perform the learning processing without using the reward values, in which case the process of step S7 does not need to be performed. If each agent 41 is realized by an individual PC, these PCs may perform the learning processing of step S9 in a stand-alone state. In this way, there is no need to connect these PCs to a network for communication or the like, and it is possible to reduce the load of processes relating to the network in each PC.

At step S11, the recommended control condition output section 416 of each of the plurality of agents 41 outputs to the control section 417 the recommended control condition data obtained by supplying the current state data to the model 415, and moves the process to step S1. In this way, the target device 20(T) is controlled according to the recommended control condition data and the learning process is repeated, to optimize the operational state of the facility 2. When the processes of steps S1 to S11 are repeated, the period of step 1 may be set according to a time constant of the facility 2, and may be set to 30 seconds, for example. Furthermore, when the processes of steps S1 to S11 are repeated, the number of devices 20 and sensors 21 in the facility 2 may be increased or decreased due to maintenance, expansion, breakdown, and the like. When the number of devices 20 in the facility 2 increases or decreases, the number of agents 41 may also be increased or decreased.

According to the operation described above, the target device 20(T) is controlled according to the recommended control condition data and the state data corresponding to this control is acquired, and therefore the learning processing of the model 415 is performed further using the learning data that includes the recommended control condition data and the state data corresponding to this recommended control condition data. Accordingly, it is possible to increase the learning accuracy by sequentially performing the learning processing of the model 415 in a case where the control is performed according to the recommended control condition data.

Since state data common among at least two agents 41 is used in the learning processing, the control result of a target device 20(T) by one agent 41 is indirectly reflected in the learning processing of the target device 20(T) by the other agent 41. Accordingly, agents 41 that set some of the devices 20 in the facility 2 to be target devices 20(T) can indirectly cooperate with each other, and it is possible to perform the learning processing to optimize the control conditions of each target device 20(T). In a case where there is a relation with regard to the operations or the like between the target device 20(T) of one agent 41 and the target device 20(T) of another agent 41, the control result of the target device 20(T) of the one agent 41 is indirectly reflected in the learning processing performed by the other agent 41, and therefore it is possible to obtain more suitable control conditions for the recommended control conditions recommended to the other agent 41.

Since the control condition data of another device 20 that is not a target device 20(T) is included in the state data and used in the learning processing, it is possible to improve the learning accuracy compared to a case where the control condition data of this other device 20 is not included in the state data. For example, in a case where the state data of a target device 20(T) of one agent 41 is affected by the control of another device 20 that is not a target device 20(T), the control condition of this other device 20 is indirectly reflected in the learning processing performed by this one agent 41, and therefore it is possible to obtain more suitable control conditions for the recommended control conditions recommended to the one agent 41.

4. Modifications

Figure 4:
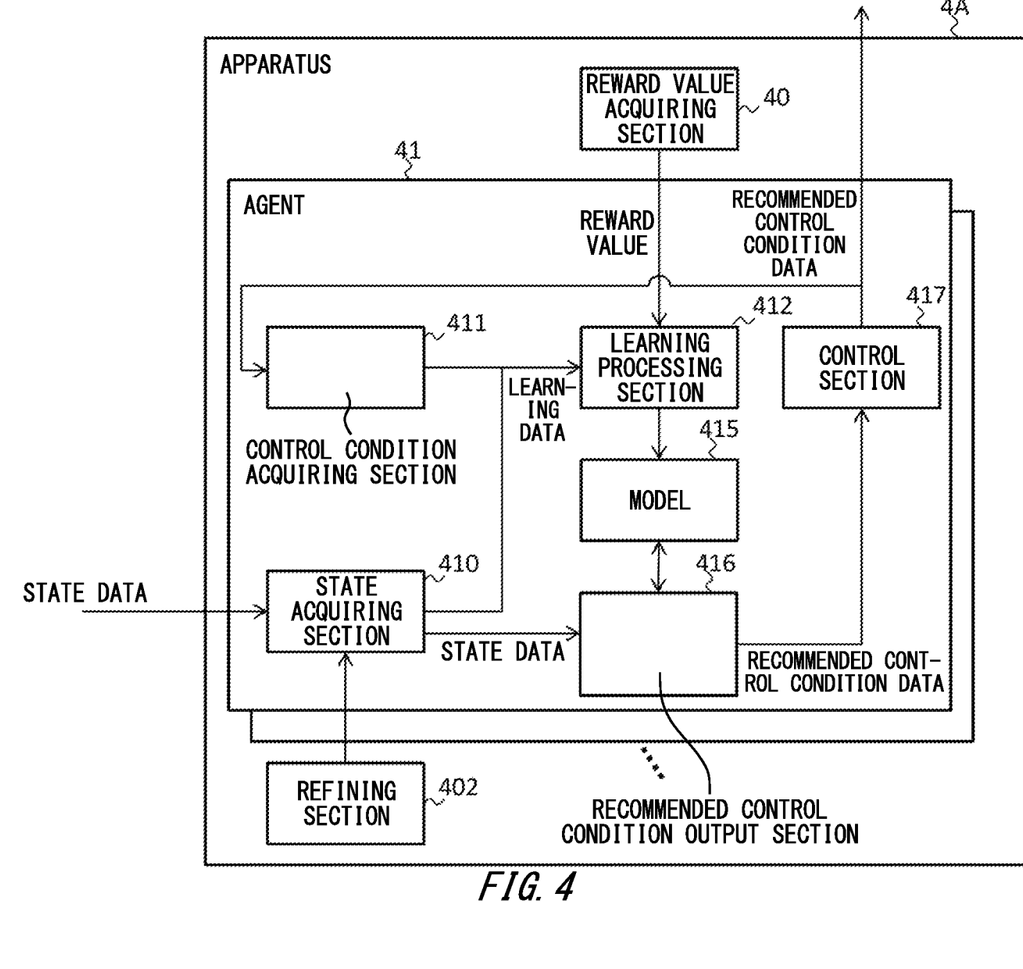
FIG. 4 shows an apparatus 4A according to a modification.

FIG. 4 shows an apparatus 4A according to a modification. The apparatus 4A may further include a refining section 42 that narrows down the state parameters of the state data acquired by each agent 41.

The refining section 42 may exclude any state parameters, among a plurality of state parameters that are acquisition targets of the state acquiring sections 410 of the agents 41, from being acquisition targets, based on a correlation probability among the plurality of state parameters included in the state data. The plurality of state parameters may include at least one of a measurement result obtained by each sensor, an identification result obtained by each sensor 21, and a control condition of each device 20. The refining section 42 may exclude state parameters having a correlation probability with the control condition of the target device 20(T) of an agent 41 that is lower than a reference probability, among the plurality of state parameters that are acquisition targets of the state acquiring sections 410 of the agents 41, from the acquisition targets. The refining section 42 may stop the acquisition of a state parameter by supplying the state acquiring section 410 of each agent 41 with identification information of this state parameter to be excluded from the acquisition targets.

According to the apparatus 4A described above, it is possible to narrow down the state parameters in each agent 41 and perform the learning process, thereby making it possible to converge the learning in a short time. Furthermore, the learning can be caused to converge in a manner to be globally optimal across a plurality of devices 20 having defined correlation probabilities.

Figure 5:
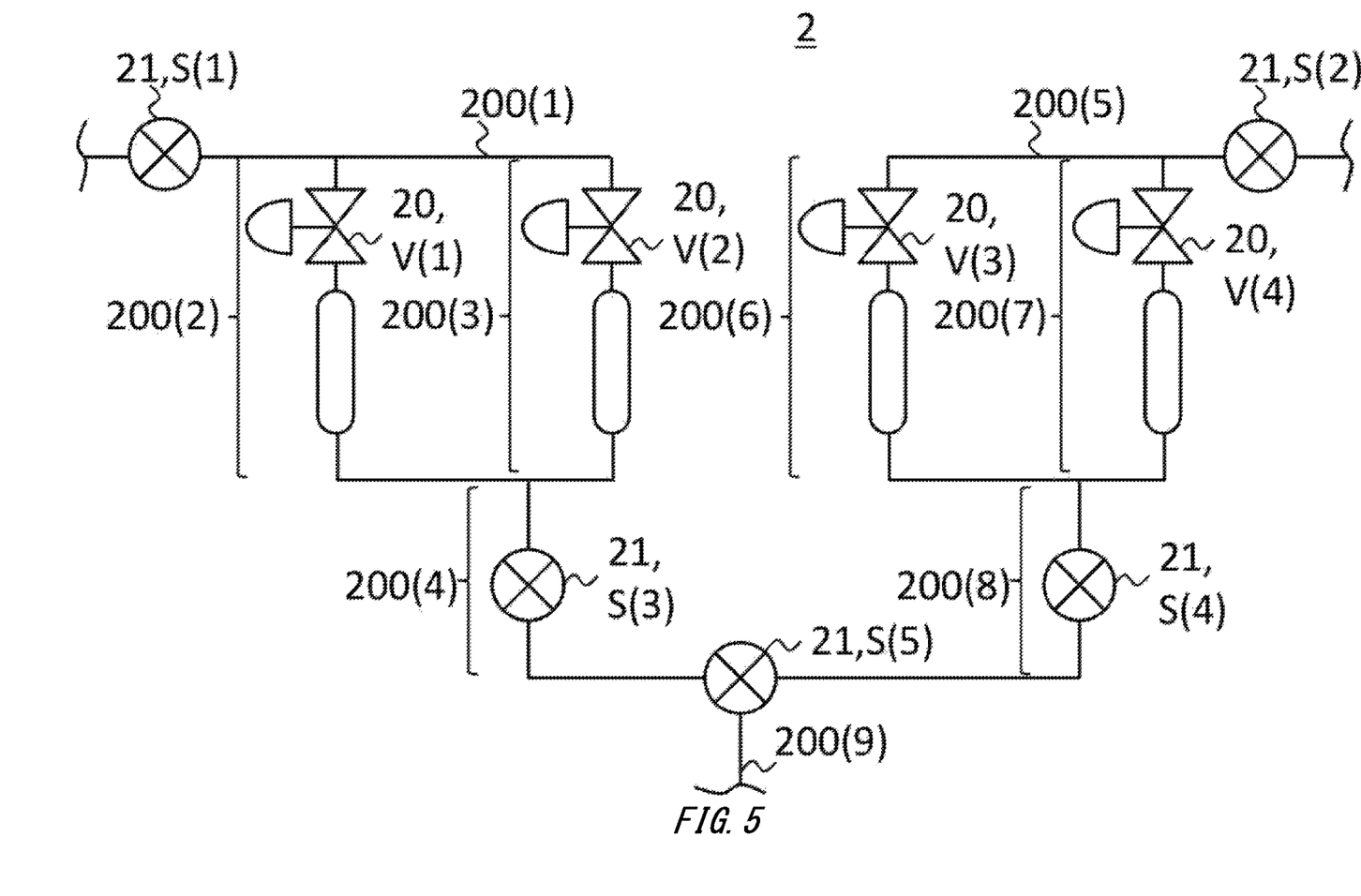
FIG. 5 shows a portion of a piping instrumentation diagram of the facility 2.

FIG. 5 shows a portion of a piping instrumentation diagram of the facility 2. In the example of the present drawing, the facility 2 includes pipes 200(1) to 200(9), flowmeters S(1) to S(5) serving as the sensors 21, and valves V(1) to V(4) serving as the devices 20. One end of the pipe 200(1) is connected to one end of the pipe 200(2) and one end of the pipe 200(3), the other ends of the pipes 200(2) and 200(3) are connected to one end of the pipe 200(4). One end of the pipe 200(5) is connected to one end of the pipe 200(6) and one end of the pipe 200(7), the other ends of the pipes 200(6) and 200(7) are connected to one end of the pipe 200(8). The other ends of the pipes 200(4) and 200(8) are connected to one end of the pipe 200(9). The flowmeters S(1) and S(2) are respectively provided in the pipes 200(1) and 200(5), and measure the flow rates thereof. The flowmeters S(3) and S(4) are respectively provided in the pipes 200(4) and 200(8), and measure the flow rates thereof. The flowmeter S(5) is provided at the connection portion between the pipes 200(4), 200(8), and 200(9), and measures the flow rate in this connection portion. The valves V(1) to V(4) are respectively provided in the pipes 200(2), 200(3), 200(6), and 200(7), and adjust the flow rates thereof.

When there is a desire to change the flow rate of the pipe 200(8) in such a facility 2, it is only necessary to change the opening degree of the valve V(3) or the valve V(4), and the opening degrees of the valves V(1) and V(2) have no effect (or a very small effect) on the flow rate in the pipe 200(8). An operator, manager of the facility 2, or the like can estimate state parameters that have no correlation (or very little correlation) from a design diagram or the like of the facility 2 in this way. The refining section 42 may stop the acquisition of certain state parameters by supplying, to the state acquiring section 410 of each agent 41, identification information of the state parameters estimated by the operator or the like to have correlation probabilities with respect to the control condition of the target device 20(T) of this agent 41 that are lower than a reference probability.

Instead of supplying the state acquiring sections 410 with the identification information of state parameters to be excluded from the acquisition targets, the refining section 42 may supply the learning processing sections 412 with a model of the correspondence between a plurality of state parameters of the facility 2. In this case, each learning processing section 412 may perform learning processing of the model 415 using the relation model to calculate the correlation probability (Bayesian probability) between state parameters. Furthermore, each learning processing section 412 may stop the acquisition of state parameters by supplying the state acquiring section 410 of the agent 41 with the identification information of state parameters for which the correlation probability with respect to the control condition of the target device 20(T) of the agent 41 has been calculated to be less than the reference probability. In this case, it is possible to more reliably cause the learning to converge in a manner to be globally optimal, compared to a case where the state parameters are excluded from the acquisition targets based on an estimation made by the operator.

Figure 6:
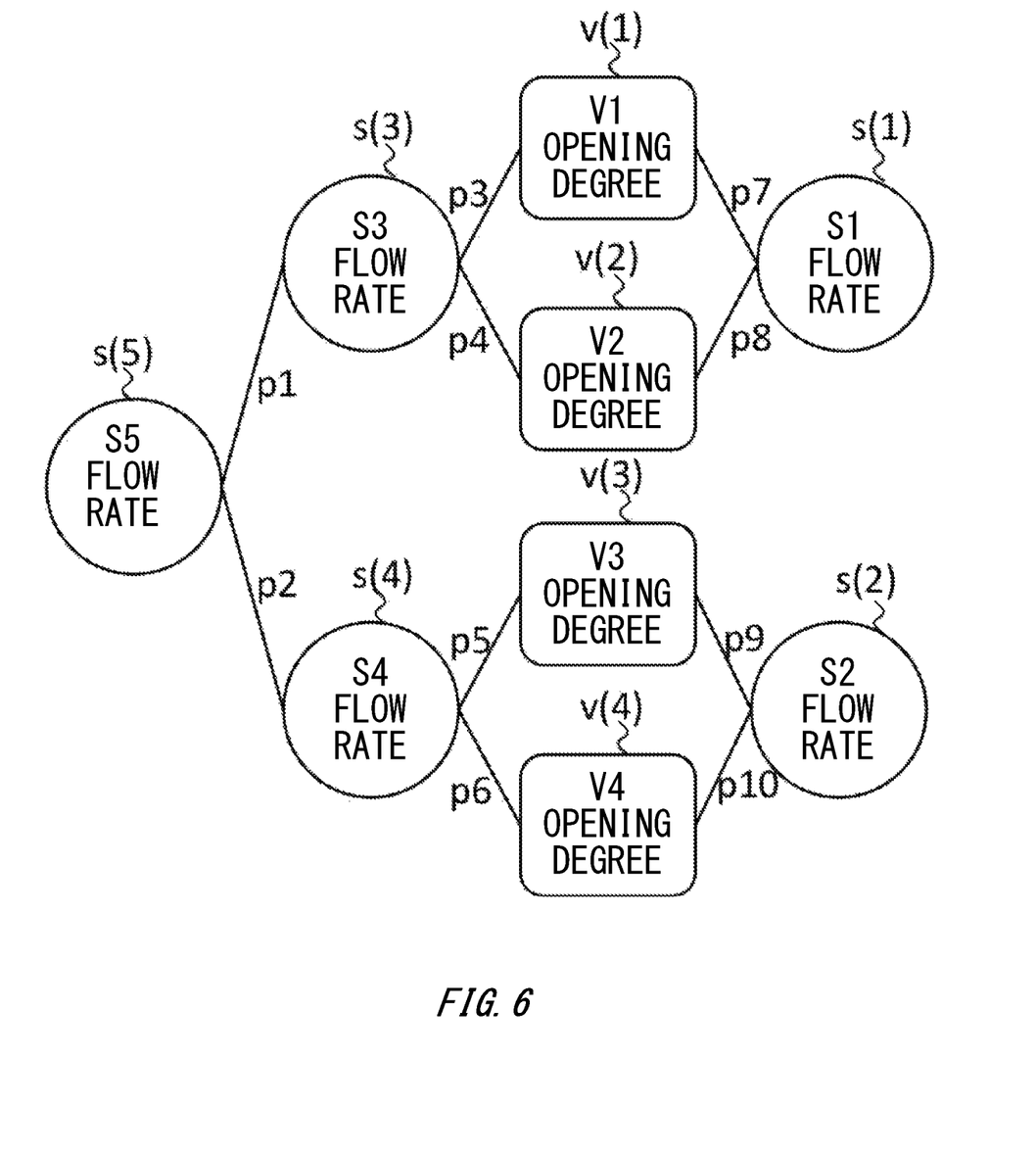
FIG. 6 shows a relation model between state parameters in the facility 2 of FIG. 5.

FIG. 6 shows a relation model between state parameters in the facility 2 of FIG. 5. In this relation model, each conditional parameter is expressed by one of the nodes s(1) to s(5) and (1) to v(4), and related nodes are connected to each other by edges. A correlation probability p1 to p10 between the nodes connected by the edge is associated with each edge. The initial value may be 1 for all of the correlation probabilities p1 to p10, and may be changed according to the results of the learning processing. Here, the nodes s(1) to s(5) indicate the flow rates measured by the flowmeters S(1) to S(5), and the nodes v(1) to v(4) indicate the opening degrees of the valves V(1) to V(4).

Each learning processing section 412 may calculate the correlation probability between state parameters using such a relation model. For example, the learning processing section 412 may calculate the correlation probability between the state parameters by learning whether there is a possibility of the flow rate measured by any of the flow meters S among the flow meters S(1) to S(5) changing significantly, for example, when the valve opening degree of any one of the valves V(1) to V(4) is changed. As an example, the correlation probability p indicating the degree by which the flow rate of the flowmeter S(1) affects the flow rate of the flowmeter S(5) can be calculated as $p=(p7*p3+p8*p4)*p1$. Furthermore, the correlation probability p indicating the degree by which the flow rate of the flowmeter S(3) affects the flow rate of the flowmeter S(5) can be calculated as $p=p1$.

5. Other Modifications

In the embodiment described above, the facility 2 includes the sensors 21, but the sensors 21 do not need to be included in the facility 2. In this case, the state acquiring section 410 of the apparatus 4 may acquire the state data (e.g. a pressure value indicated by a dial when a mechanical pressure meter is used) from an operator who has checked the state of the facility 2.

The apparatus 4 described above includes the reward value acquiring section 40, but the apparatus 4 does not need to include the reward value acquiring section 40. In this case, the learning processing section 412 of each agent 41 may acquire the reward values by inputting the state data into the reward function.

Each agent 41 described above includes a recommended control condition output section 416 and a control section 417, but may omit at least one of these section. If each agent 41 does not include the recommended control condition output section 416, the model 415 on which the learning processing section 412 performs the learning processing may be connected to another apparatus and used in the operation of the facility 2. If each agent 41 does not include the control section 417, the operator may manually control the target device 20(T) of each agent 41 according to the recommended control condition data output from the recommended control condition output section 416 of this agent 41.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

The computer-readable medium may be a tangible device that can store instructions to be executed by a suitable device, and as a result, a computer-readable medium having instructions stored thereon is a product that includes instructions that can be executed in order to create the means for executing the operations designated by flow charts and block diagrams. Examples of the computer-readable medium may include an electronic storage device, a magnetic storage device, an optical storage device, an electromagnetic storage medium, a magnetic storage medium, an optical storage medium, an electromagnetic storage medium, a semiconductor storage medium, and the like. Specific examples of the computer-readable medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disk (DVD), a Blu-ray (Registered Trademark) disk, a memory stick, an integrated circuit card, or the like.

The computer-readable instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (Registered Trademark), C++ or the like, and conventional procedural programming languages, such as the "C" programming language or similar programming languages.

The computer-readable instructions may be provided to a processor or programmable circuitry of a general purpose computer, special purpose computer, or other programmable data processing apparatus to produce a machine, either locally, via a local area network (LAN), or via a wide area network (WAN) such as the Internet, and may be executed to create the means for performing the operations designated by the flow charts and block diagrams. Examples of the processor include a computer processor, a processing unit, a microprocessor, a digital signal processor, a controller, a microcontroller, and the like.

Figure 7:
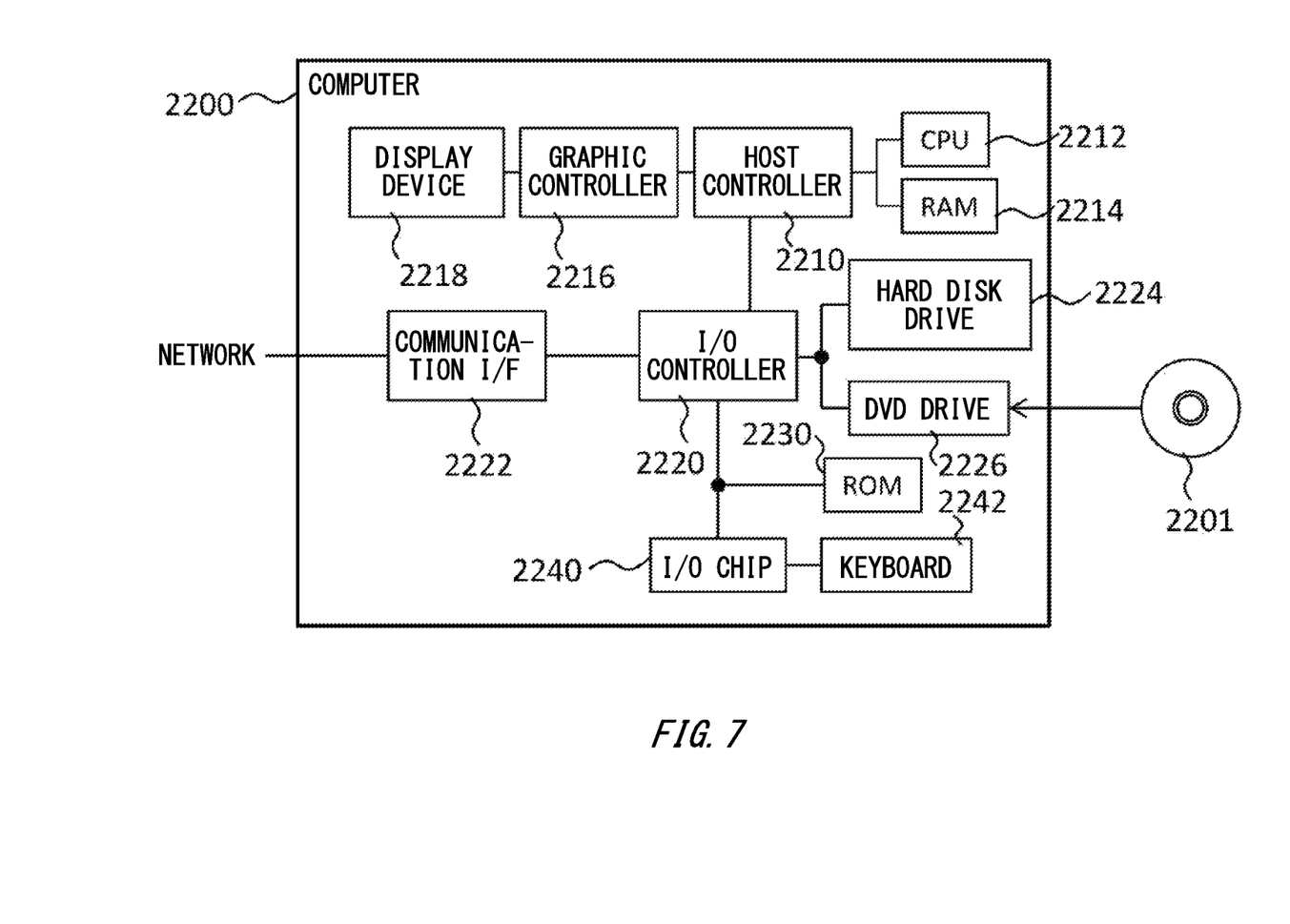
FIG. 7 shows an example of a computer 2200 in which aspects of the present invention may be wholly or partly embodied.

FIG. 7 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

1: system, 2: facility, 3: network, 4: apparatus, 20: device, 21: sensor, 40: reward value acquiring section, 41: agent, 42: refining section, 200: pipe, 410: state acquiring section, 411: control condition acquiring section, 412: learning processing section, 415: model, 416: recommended control condition output section, 417: control section, 4160: predicted state output section, 4161: predicted reward value output section, 4162: control condition series specifying section, 4163: recommended control condition specifying section, 2200: computer, 2201: DVD-ROM, 2210: host controller, 2212: CPU, 2214: RAM, 2216: graphic controller, 2218: display device, 2220: input/output controller, 2222: communication interface, 2224: hard disk drive, 2226: DVD-ROM drive, 2230: ROM, 2240: input/output chip, 2242: keyboard

What is claimed is:

1. An apparatus comprising a plurality of agents that each set one or more devices among a plurality of devices provided in a facility to be target devices, wherein each of the plurality of agents includes:
   a control section that controls the target device according to a control condition indicated by recommended control condition data;
   a state acquiring section that acquires state data indicating a state of the facility after the target device has been controlled by the control section;
   a control condition acquiring section that acquires control condition data indicating a control condition of each target device;
   a learning processing section that uses kernel dynamic policy programming to generate learning data including the state data and the control condition data to perform learning processing of a model that outputs recommended control condition data indicating a control condition recommended for each target device in response to input of the state data and distributes the learning processing for the target device among the plurality of agents.

2. The apparatus according to claim 1, wherein
each learning processing section performs the learning processing of the model using the learning data and a reward value determined according to a preset reward function, and
each model outputs the recommended control condition data indicating the control condition of each target device recommended for increasing the reward value beyond a reference reward value, in response to input of the state data.

3. The apparatus according to claim 1, wherein
each of the plurality of agents further includes a recommended control condition output section that outputs the recommended control condition data obtained by supplying the model with the state data.

4. The apparatus according to claim 3, wherein
each recommended control condition output section uses the model to output the recommended control condition data indicating a closest control condition included in a control condition series that is most highly recommended, among a plurality of control condition series obtained by selecting any one control condition from among a plurality of control conditions of the target device at each of a plurality of future timings.

5. The apparatus according to claim 1, wherein
the state acquiring sections in at least two agents among the plurality of agents acquire the state data that is common therebetween.

6. The apparatus according to claim 1, wherein
the state acquiring section of at least one agent among the plurality of agents acquires the state data that further includes control condition data indicating a control condition of a device that is not a target device of the at least one agent among the plurality of devices.

7. The apparatus according to claim 1, wherein
the learning processing section of each agent performs learning processing using kernel dynamic policy programming for the target device.

8. The apparatus according to claim 1, wherein
a collection of target devices of each of the plurality of agents includes only target devices that are not in a collection of target devices of each other agent differing from this agent among the plurality of agents.

9. The apparatus according to claim 8, wherein
each of the plurality of agents sets a single device to be the target device.

10. The apparatus of claim 1 further comprising:
where the number of devices among the plurality of devices is decreased in response to outputting recommended control condition data indicating a control condition.

11. A method in which a plurality of agents, which each set one or more devices among a plurality of devices provided in a facility to be target devices, comprising:
   acquiring control condition data indicating a control condition of each target device;
   controlling the target device according to the control condition indicated by recommended control condition data;
   acquiring state data indicating a state of the facility in response to the target device being controlled according to the control condition; and
   using kernel dynamic policy programming to generate learning data including the state data and the control condition data to perform learning processing of a model that outputs recommended control condition data indicating a control condition recommended for each target device in response to input of the state data.

12. A non-transitory recording medium storing thereon a program that causes one or more computers to function as a plurality of agents that each set one or more devices among a plurality of devices provided in a facility to be target devices, wherein each of the plurality of agents includes:
   a state acquiring section that acquires state data indicating a state of the facility;
   a control condition acquiring section that acquires control condition data indicating a control condition of each target device;
   a learning processing section that uses kernel dynamic policy programming to generate learning data including the state data and the control condition data to perform learning processing of a mod& that outputs recommended control condition data indicating a control condition recommended for each target device in response to input of the state data;

a control section that controls the target device according to the control condition indicated by the recommended control condition data; each state acquiring section acquires the state data in response to the target device being controlled by the control section;

the learning processing for the target device is distributed among the plurality of agents.

13. The non-transitory recording medium of claim 12 further comprising:

where the number of devices among the plurality of devices is decreased in response to outputting recommended control condition data indicating a control condition.

* * * * *